Jan. 3, 1967   K. J. MACKEY   3,295,298
DUST COLLECTING DOWN DRAFT BENCH
Filed May 18, 1964   2 Sheets-Sheet 1

INVENTOR
KENNETH J. MACKEY

BY ROBERT M. DUNNING
ATTORNEY

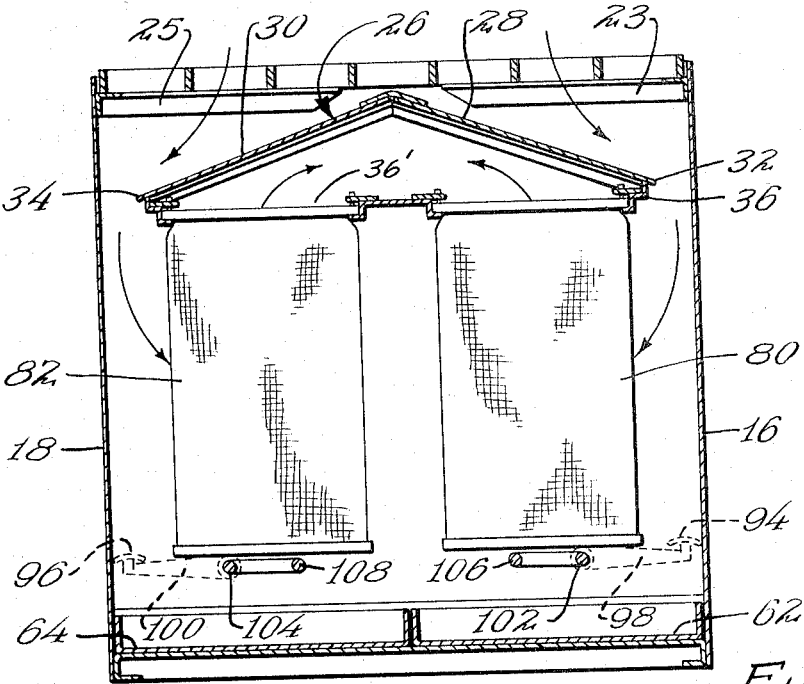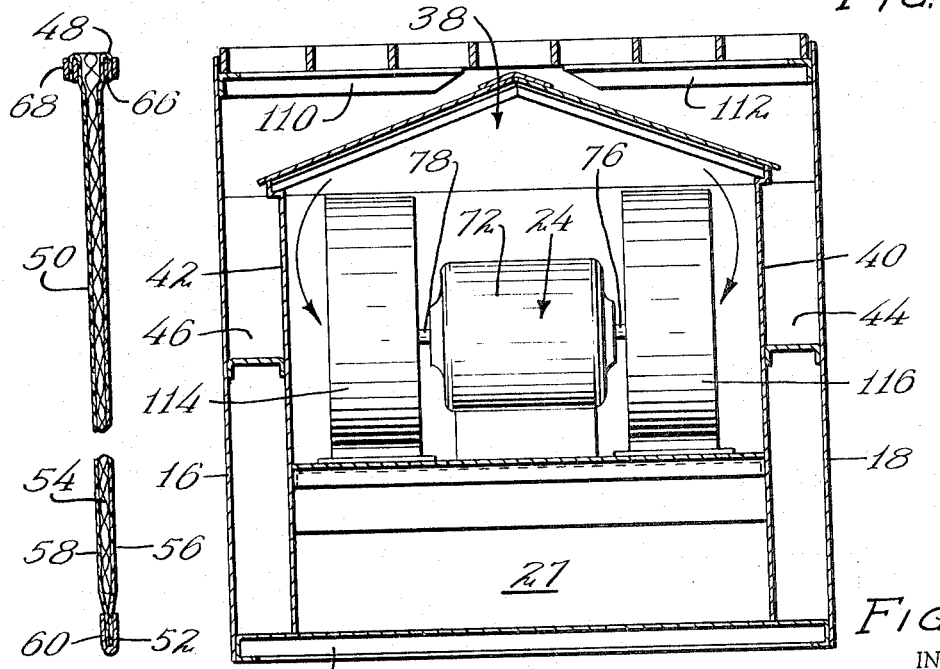

United States Patent Office 3,295,298
Patented Jan. 3, 1967

3,295,298
DUST COLLECTING DOWN DRAFT BENCH
Kenneth J. Mackey, St. Paul, Minn., assignor to Torit
Manufacturing Company, St. Paul, Minn., a corporation of Minnesota
Filed May 18, 1964, Ser. No. 368,025
10 Claims. (Cl. 55—305)

This invention relates to a dust collecting down draft bench having deflection means whereby the flow of dust laden air is directed through a filtering section comprised of bag type filters, the filtered air being ducted through the outside by blowers air-sealed from dust laden air within the bench.

It is an advantage of the present invention that the bench may be made in a geometric design to accommodate production line without detracting from the filtering capacity of the bench.

It is a further advantage of the present invention that in large benches dual or multiple blower systems may be utilized advantageously, the blowers being coupled with banks of filtering bags to provide maximum area during filtration.

It is a further object of the present invention to provide a dust collecting down draft bench having an outlet provided for air in the body of the bench which may be situated either in the side or bottom wall of the bench as desired.

It is a further object of the present invention to provide a down draft dust collecting bench in which filter bag elements are employed in banks so that air being filtered must pass through the bag thereby resulting in collection of dust upon the outer surface of the bag whereby it may be easily removed by shaker means into dust collecting receptacles.

It is a further object of the present invention to provide filter bags having a filter cloth outer surface, the bags being sealed at one end and containing within the panels of the bags spacer means whereby the bag is retained in non-collapsible extended relation during the filtering process, the open end of the bag being secured in apertures in an air duct through which the filtered air is drawn by the blower system.

It is a further object of the present invention to provide a diverter roof beneath the grid top of the dust collecting down draft bench whereby dust laden air may be directed to intake areas without the dust collecting in quantity beneath the grid top.

It is a further object of the present invention to provide shield panels separating the filtering bag units from the air intake areas so that the dust laden air may be directed into the filtering area in a particular manner.

It is a further object of the present invention to provide a dust collecting down draft which may be constructed in a strength suitable to provide a support for the work being processed.

As will be understood dust collecting down draft benches are desirable to remove dust laden air during various types of sanding, polishing, maching operations and the like, it being important that the bench be capable of removing not only larger particles but also fine dust as well from the working area. Various models have been introduced to accomplish this purpose and while some of them have had reasonable degrees of success, the filtering elements employed have not been as desirable and successful as desired.

I have found that my dust collecting down draft bench may be made in any suitable shape for the work for which it is to be employed, the bench being capable of providing removal of the dust laden air from the work area, guiding the air through the bench in such a manner as to prevent its being forced back to the outer atmosphere in a dust laden condition, drawing the air over collection pan whereby the larger particles may be collected before filtration of the air, and filtering the fine dust from the dust laden air upon the outer surface of filter bags and discharging the filtered air through an air discharge outlet in any manner desired.

It is an object of the present invention to provide filter bag units which are extremely efficient in their operation and from which dust may be readily removed by means of a shaker element, the dust removed from the filter bags being collected in pans which may be readily removed from the bench when required.

It is a further object of the present invention to provide a dust collecting down draft bench efficient in operation, relatively free from maintenance, the interior of the bench being accessible readily for removal of dust collecting pans for emptying the bench being adapted to be fitted into any work area due to the flexibility of its outer design.

It is a further object of the present invention to provide a dust collecting down draft bench having a grid top which may be held in either a stationary or a pivotal relation to the supporting sides without interfering with the filtering process of the unit.

My down draft bench comprises a body portion having upstanding side walls which are connected together and which are secured to a bottom member to provide a hollow body. A grid top is provided through which dust laden air may be drawn by a blower means situated within the hollow body. An air discharge outlet is provided in cooperation with the blower through which filtered air may be discharged from the bench. A filtered air duct is provided in cooperation with the blower, the filtered air duct having an overlying diverter roof which extends substantially the full length of the bench, the roof being sloped downwardly to direct air towards the connecting sides of the bench. The edges of the downwardly sloped roof are spaced from the connecting sides so as to permit the air to be drawn down the sides of the bench. Filtering bags are provided having a closed end and an open end and spacer means in the bags to prevent their being collapsed, the open end of the bags being secured in apertures in the bottom shelf of the air duct. The bags are suspended within the bench in spaced side by side relation to provide a bank of filtering elements. The dust laden air is drawn down the side of the bench, the depth to which the air is drawn downwardly being controlled by panels intermediate the filter bag elements and the connecting side walls. The dust laden air travels under the panel walls and is filtered by the filter units with the dust collecting on the outside of the bags. The filtered air is drawn by the blowers into the air duct through the blower whereby it is discharged through the air outlet. A variety of shapes in the geometric construction of the bench are possible, and the number of filter bag units may be varied according to the capacity of the blowers and the work area to be served. Additionally multiple blowers may be provided together with multiple banks of filter elements for particular purposes.

These and other objects and particular advantages will be more particularly described in detail in the accompanying specification taken in connection with the drawings herein in which:

FIGURE 3 is a view taken in cross sectional elevation along the lines 3—3 of FIGURE 2, particularly showing the diverter roof and the air duct in relation to banks of filters.

FIGURE 4 is a cross sectional elevational view taken along the lines 4—4 of FIGURE 2 which provides an opposed view to that of FIGURE 3 and showing the relation of a dual blower in relation to the air opening and the air duct.

FIGURE 5 is a cross sectional view of the filter bag particularly showing the closed end and the spacer means within the bag and the open end of the bag.

Figure 1:
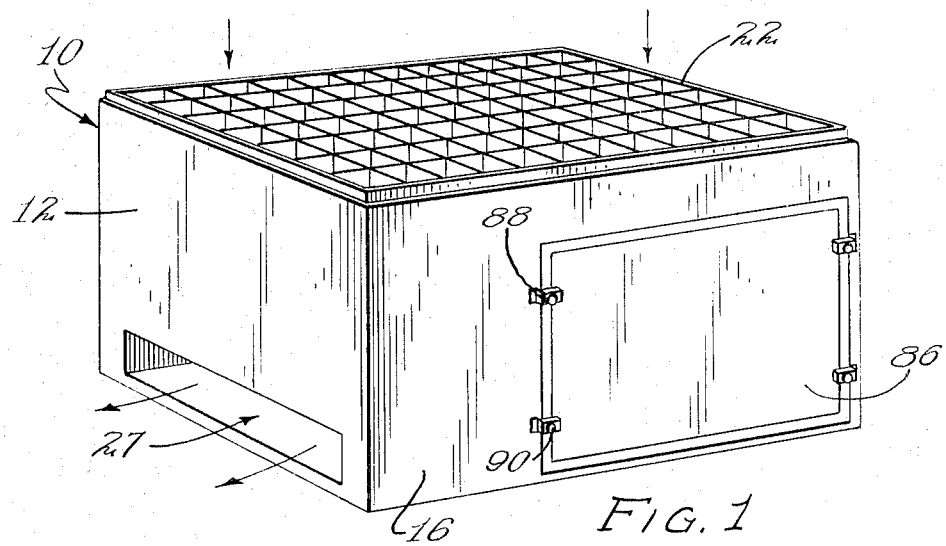
FIGURE 1 is a perspective view of my down draft collecting bench in rectangular form particularly showing the grid top and the air discharge outlet, together with an access door to the interior of the bench.

As may be seen in FIGURE 1, I provide a down draft bench generally numbered 10 which have an external outline or shape to accommodate its particular locational use.

The rectangular shape shown in FIGURE 1 is provided for purposes of description, and it will be understood that the principle of filtration and the mechanics employed therein may be used in other geometric shapes such as circular benches if desired.

The bench 10 has opposed upstanding imperforate end walls 12 and 14 and side walls 16 and 18 which are secured along their bottom edges to an imperforate base member 20. The bench 10 may rest on the base member 20 or it would be an obvious expedient to provide legs secured to the base member on which to support the bench.

The base member 20, together with end walls 12 and 14 and side walls 16 and 18 provide a hollow compartment which is adapted to receive air through a grid top 22 which will be further described, and to discharge the air through a discharge opening such as the opening generally numbered 27 provided in one of the walls of the body of the bench.

It will be understood that usage of the word imperforate is designed to indicate the solidity of the wall to the passage of air.

Any preferred structural material sufficient to support the load to which the walls and bases are subjected may be used. Obviously steel, wood, tempered plastics and combinations thereof would prove suitable for my purpose.

It will be obvious that where the bench must support a great weight, that strength members will necessarily have to be provided.

Dust-laden air is pulled downwardly through the grid top 22 by a blower means generally numbered 24. The grid top 22 is clearly shown in FIGURE 1. The size of the grid openings are such that larger particles may pass through them readily as well as the smaller dust particles. The upper surface of the grid is preferably of some materials such as aluminum which is durable, but unlikely to cause a marring of any product being supported on the surface of the grid.

Obviously, the grid may be protectively coated by plastic, rubber, and the like for particular job applications.

As may be clearly seen in FIGURE 3, the grid is supported by arm members such as 23 and 25 which underlie the grid and hold it in supported relation. Additional supports may be provided depending upon the load to be carried by the grid and the supporting wall structure.

The direction of flow of air within the bench 10 is initially determined by a sloping diverter roof generally numbered 26 having downwardly sloping gable portions 28 and 30. The roof is positioned beneath the grid top 22, and overlies in a fashion to be subsequently detailed the filtering elements of the bench. The roof 26 extends between opposed wall surfaces such as end walls 12 and 14. The side edges 32 and 34 of the gable portions 28 and 30 are in spaced relation from the connecting side walls 16 and 18. A shelf 36 is secured to the edges of the gables 28 and 30 in air sealed relation to form an air conducting means such as a duct generally numbered 38.

Panels 40 and 42 extend downwardly from the shelf 36 towards the bottom member 20. The panels 40 and 42 extend intermediate the opposed wall surfaces of the ends 12 and 14. The depth of the panel members 40 and 42 limits access of the dust laden air to the filtering sections as will be further described.

Baffle means 44 and 46 slope downwardly from the end wall 12 toward the bottom 20 to direct dust laden air toward the bottom edges of the downwardly extended panels 40 and 42. The baffle 44 is shown in dotted outline in FIGURE 2 in relation to the blower. The shelf member 36 has a series of elongated apertures 36' in spaced side by side relation in which are coterminously secured to the open end 48 of elongated filter bags such as the bag 50 shown in FIGURE 5. The filter bag 50 has an open end 48 and a closed end 52. The filter bag 50 is of the type known as a cloth filter, a stiffening member 54 being provided within the bag 50 to hold the bag in non-collapsing extended relation. The bag extends downwardly from the shelf member towards the bottom 20. In the preferred construction illustrated in FIGURE 2, the bag filters are in spaced side by side relation to each other and are shown in generally parallel relation to the end walls 12 and 14. Obviously, in a circular outer construction of the body of the bench it might be more accurate to state that the filter bags extend perpendicularly to the shelf and panels.

Figure 2:
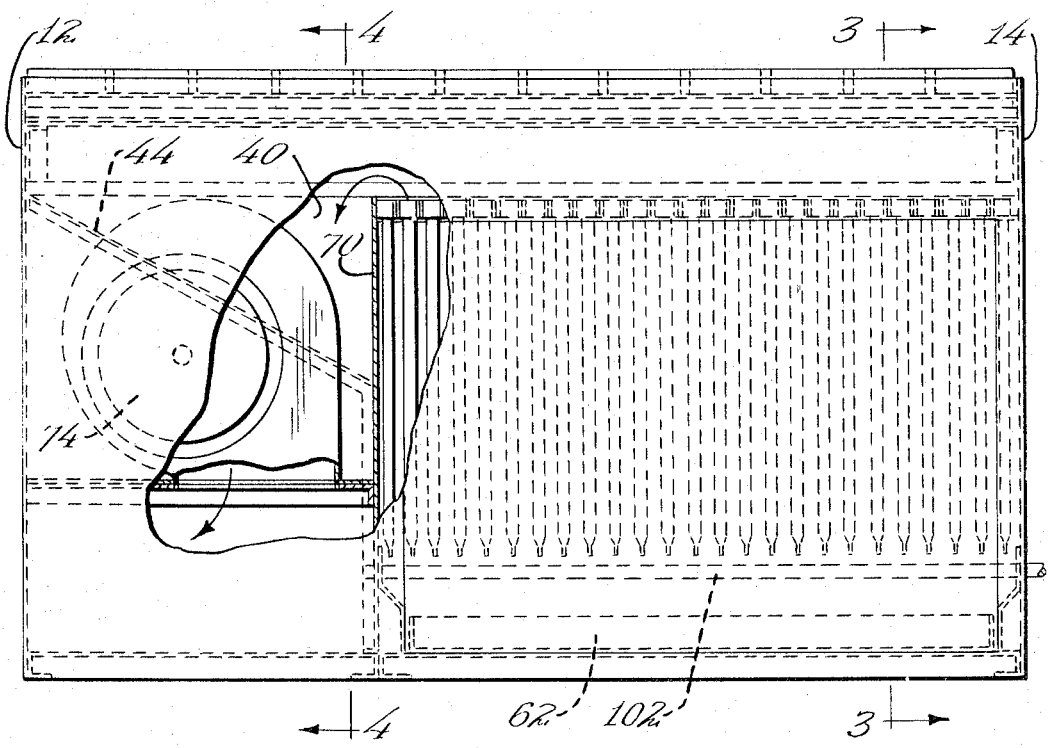
FIGURE 2 is a section taken longitudinally of the bench shown in FIGURE 1, the filter bag units shown in a bank in dotted outline in relation to a blower. A portion of the wall is broken away to more particularly show the open ends of the filter bags and the direction of air flow.

It will be apparent that dust laden air is filtered by passage of the air into the filter bag and out through the open end of the filter bag. The dust in the air is collected on the outer surface of the filter bag. The number of filter bags which are provided in any series will vary with the amount of air which is to be filtered, the size of the unit, and the type of blower construction, that is, whether single or double for example. The bank of filters provided in the filter section such as may be clearly in FIGURE 2 provides an unusually efficient filtration of the dusty air.

The sides 56 and 58 of the filter 50 are held in spaced apart relation by the stiffener means such as the spacer 54.

It will be understood that the portions of the shelf enclosing the apertures in which the open ends of the filter bags are secured prevent entrance of air into the air duct 38 except through the open end of the filter bag secured in the apertures. The bottom end of the filter bag 50 is clamped in closed relation of the sides 56 and 58 by clamping means 60 such as a clip. The clamping means 60 is adapted to be engaged by a shaker arm to shake the filter bag so as to remove dust collected on the bags. The dust falls into dust collecting pans 62 and 64.

It will be understood that the spacer 54 holds the filter bag in extended, non-collapsible relation of the sides of the bag during the filtering process. The spacer means 54 is preferably of inexpensive construction such as crimped, woven wire mesh, through which the filtered air may readily pass.

The open end of the filter bag 50 in preferred construction has the ends of the cloth sides 56 and 58 cemented to a steel collar member 66 together with an outer seal 68 of felt or similar material to tightly seal the open end of the filter bag 50 in an aperture of the shelf 36. Obviously, other materials would serve equally effectively for the collar or the outer seal, but these are believed obvious.

The banked relation of the filter bags may be clearly seen in FIGURE 2.

Tracing the air flow it will be seen the dust laden air enters through the grid top 22, passes down along the diverter roof 26 spaced beneath the grid top 22 toward the connecting side walls 16 and 18. Spacing of the panels 40 and 42 from the walls 16 and 18 provides an intake area into which the dusty air may pass. The air travels towards the bottom 20 until it may pass the edge of the diverter roof 26 to enter the filter section. The dusty air is drawn towards the filter bags with the dust collected upon the outside of the bags as the air is filtered. The filtered air passes out of the open end of the bag into the air duct 38. The filtered air then passes from the duct 38 through an air access opening in the duct which will be further described to the blower means by which it is discharged through the air discharge opening 27. The blower is separated or air shielded from the other portions of the bench by a partition wall 70 as may be clearly seen in FIGURE 2. In preferred construction, this partition wall 70 extends between the bottom 20 and the shelf 36. The blower is enclosed by the side panels 40 and 42 and the partition wall 70 from the air in the other portions of the bench. The opening to the blower 24 is obtained by terminating the shelf 36 at the partition wall 70 to provide the air access opening to the blower 24.

In the drawing of FIGURE 4 double blower construction is used, the motor 72 driving a pair of blower fans such as the fan 74 shown in FIGURE 2 mounted on shafts 76 and 78. In this construction, parallel banks of filters 80 and 82 are provided, the number of filters in any particular bank being subject to the filtering requirement of the bench. Dust laden air may pass down the diverter roof 38 to either side to be drawn down to the filter section. The air passes through the filter banks as previously described into the air duct 38 from whence it passes to the blower fans and is subsequently discharged through the air discharge opening 27.

Passage of the air out of the open ends of the filter bag to the blower means is readily effected.

It will be noted that partitioning off of the blower means from the remainder of the bench precludes any possibility of dust laden air entering the blower.

As may be clearly seen in FIGURE 3, dust collecting pans 62 and 64 are provided beneath the banks of filter bags to collect the dust which is shaken from the bags. To enable the dust to be removed from the bags, the shaker bar 84 is provided extending beneath the closed ends of the bag. The shaker bar has an externally protruding portion which in preferred construction has a step-on handle whereby the shaker bar may be readily moved to shake the filter bags to dislodge any dust on the outside of the bags. As the shaker bar induces a flexing motion in the filter bags, dust is shaken from the bags into the collection pan such as 62 shown in FIGURE 2.

Access doors such as 86 are provided to enable the dust collecting pans to be readily removed. Obviously in the double blower construction illustrated in FIGURES 3 and 4, access doors would be required on opposite sides of the bench. The access doors are removable preferably and are held in paneled relation to the sides of the bench by latches such as 88 and 90 for example and have normally closed relation to the bench, but are removable to enable the dust collecting pans to be easily removed.

As may be clearly seen in FIGURE 3 where double banks of filters are provided, a pair of shaker arms are provided having external step-on handles 94 and 96 having arms 98 and 100 extending from the step-on handle portion to a central pivot 102 and 104 connected to the elongated shaker arms 106 and 108.

As previously explained, the supporting arms 23 and 25 are provided as frequently as necessary to support the grid top 22. An additional pair of these arms numbered 110 and 112 are shown in FIGURE 4. Intervening arms between the arms 23 and 25 and the arms 110 and 112 may readily be provided.

As is apparent in FIGURE 4 in the double blower construction air chambers such as 114 and 116 are provided. These are connected by air access openings to the air duct 38 and shielded from other portions of the bench as previously described.

It will be obvious that a single blower bench or multiple bench may be provided based on the principles disclosed herein. Further, should the necessity arise, the air duct could be separated by an elongated partition so that the bench blowers would draw only from a particular side. Obviously, under the circumstances described generally a partition rising above the grid top would similarly be provided to separate independent workmen.

As is obvious, the slope gabled construction of the diverter roof not only serves to guide the dust laden air downwardly but further serves to prevent an accumulation of the dust on the roof of the diverter.

Sealing of the shelf to the roof edges may be accomplished in any suitable way so as to provide the air tight sealing desired.

Returning again to the filter bag construction shown in FIGURE 5, it would be apparent that the width and length of the bag in comparison to its thickness may be readily changed during construction.

The intention is to provide an extensive surface along which the dust-laden air may pass during the filtering. Obviously, motors and fans of greater capacity may be utilized with filter bags of greater area to produce the desired filtration. The shelf 36 may be comprised of series of channels having the desired elongated apertures in which the bags are secured, the channels being placed side by side to form an air tight shelf and further to aid in holding the open ends of the bags in spaced relation from adjacent bags.

I will point out in addition that variations in the control of the air may be introduced by extension of the panels 40 and 42 toward the opposed end of the bench. As such variations in control are believed obvious as well as the effect which would be produced by panels extending almost to the bottom 20, this modification will not be detailed.

In accordance with the patent office statutes, I have set forth the best embodiments of my invention and I desire to have understood that obvious changes may be made within the scope of the accompanying claims without departing from the spirit of my invention.

I claim:
1. A dust collecting down draft bench comprising:
 (a) a hollow body having a bottom integrally secured to upstanding continuous walls and a grid top through which dust laden air may pass,
 (b) said body having an air discharge opening,
 (c) blower means in said body adapted to discharge air through said opening,
 (d) an elongated downwardly sloping roof member overlying said blower means extending between opposed walls,
 (e) said roof member having an edge spaced from a wall connecting said opposed walls,
 (f) shelf means intermediate said bottom and said roof member secured to said roof member along marginal edges to form an air duct means,
 (g) said duct means having an air opening relative to said blower through which air is adapted to be drawn by said blower,
 (h) said shelf means extending in generally parallel relation to said bottom and having elongated aperture means,
 (i) filter bag means having an open end and a closed end and spacer means in said filter bag means to hold the sides of the filter bag means in non-collapsible extended relation,
 (j) said open end of said filter bag means coterminously secured in said elongated aperture means,
 (k) means enclosing said blower cooperable with said duct means air opening whereby said blower is adapted to receive air within said body only through said duct means air opening.

2. The structure of claim 1 and in which said shelf means includes a plurality of spaced apertures and a plurality of filter bag means secured in said spaced apertures.

3. The structure of claim 1 and in which said duct means includes panel members intermediate said connecting wall and said filter bag means extending downwardly toward said bottom.

4. The structure of claim 1 and in which said shelf means terminates substantially short of said opposed wall adjacent said blower to provide said air opening in said air duct, partition wall means marginally secured to the terminal end of said shelf means intermediate said blower means and said filter bag means whereby air is accessible to said blower within said body only through said air duct.

5. The structure of claim 1 and in which said body includes shaker means movably registrable with the closed end of said filter bag means whereby dust collected on said filter bag means may be shaken therefrom.

6. The structure of claim 5 and including collector pans in said body in dust collecting relation to said filter bag means, said body having access doors in said connected walls whereby said pans may be removed for emptying.

7. A dust collecting down draft bench comprising:
 (a) a hollow body having a bottom integrally secured to upstanding continuous walls and a grid top through which dust laden air may pass,
 (b) said body having an air discharge opening,
 (c) blower means in said body adapted to discharge air through said opening,
 (d) an elongated downwardly sloping roof member overlying said blower means extending between opposed walls,
 (e) said roof member having an edge spaced from a wall connecting said opposed walls,
 (f) shelf means intermediate said bottom and said roof member secured to said roof member along marginal edges to form an air duct means,
 (g) said shelf means having a plurality of elongated apertures in spaced side by side relation,
 (h) a plurality of elongated filter bags having an open end and a closed end and spacer means in said bags to hold said bags in extended non-collapsing relation,
 (i) each said filter bag having its open end coterminously secured in a said aperture,
 (j) said duct means having an air opening relative to said blower through which filtered air is adapted to be drawn by said blower,
 (k) partition means extending between said shelf means and said bottom intermediate said blower and filter bags partitioning said blower from dust laden air in said body.

8. The structure of claim 7 and in which said roof member includes a gable roof having downwardly sloped side portions, each said side having its lowest longitudinal edge spaced from a said connecting wall.

9. The structure of claim 8 and in which said shelf includes generally parallel rows of spaced apertures having filter bags secured thereto, said blower means including spaced apart fan elements, each said fan element being in ducted relation to a said row of apertures and bags.

10. The structure of claim 7 and in which said body includes a longitudinally extending shaker arm pivotal into and out of contacting registration with the closed end of said bags, and handle means externally secured to an end of said arm whereby said arm is adapted to be pivoted.

References Cited by the Examiner

UNITED STATES PATENTS 3,160,908   12/1964   Peabody et al. _____ 15—340

FOREIGN PATENTS 112,504   3/1929   Austria.

HARRY B. THORNTON, *Primary Examiner.*

B. NOZICK, *Assistant Examiner.*